Feb. 4, 1947.  S. GAGAS  2,415,241
FRICTION BOX
Filed May 28, 1946  2 Sheets-Sheet 1
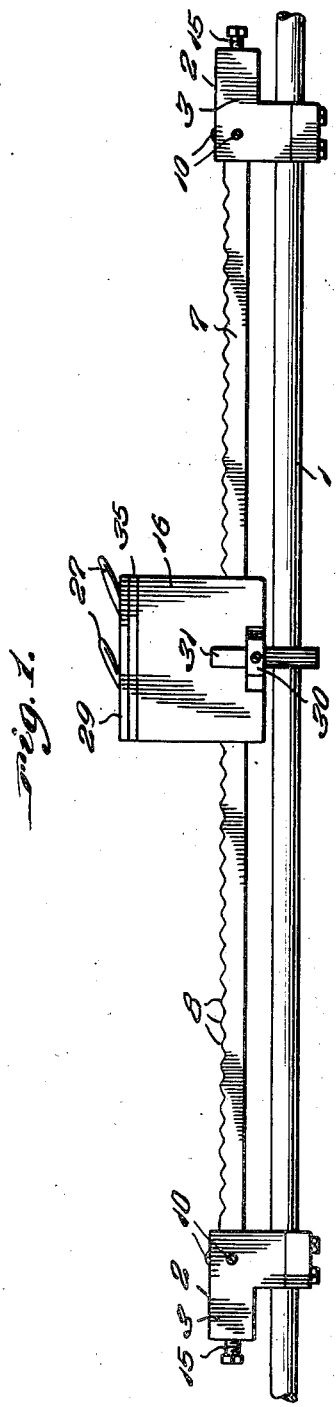
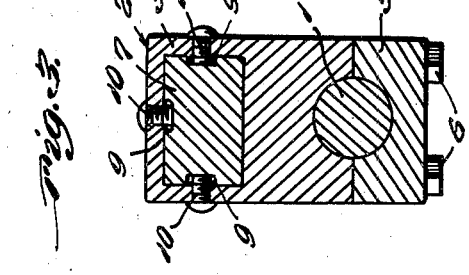
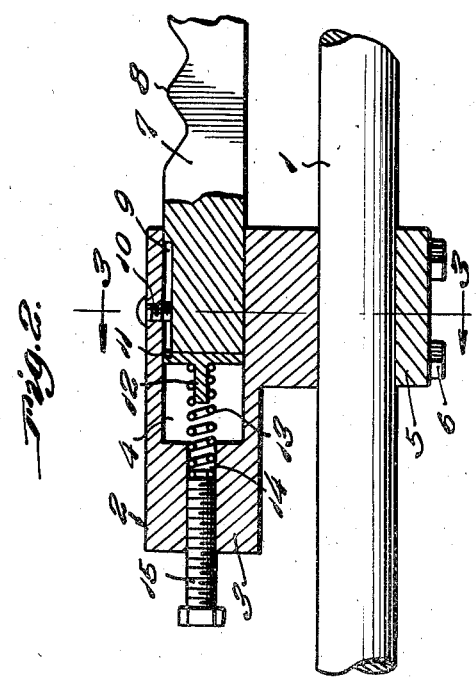
Inventor
Stanley Gagas
By Clarence A. O'Brien
and Harvey B. Jacobson
Attorneys Feb. 4, 1947.  S. GAGAS  2,415,241
FRICTION BOX
Filed May 28, 1946  2 Sheets-Sheet 2

Inventor
Stanley Gagas

By Clarence A. O'Brien
and Harvey B. Jacobson
Attorneys

Patented Feb. 4, 1947

2,415,241

UNITED STATES PATENT OFFICE 2,415,241

FRICTION BOX

Stanley Gagas, Perkasie, Pa.

Application May 28, 1946, Serial No. 672,872

8 Claims. (Cl. 66—126)

This invention relates to improvements in friction boxes adapted to be installed on a friction rod of a full-fashioned hosiery knitting machine.

An object of the invention is to provide an improved friction box for positioning on the friction rod of a full-fashioned hosiery knitting machine to maintain the friction pressure on the friction bar constant at the correct working pressure.

An object of the invention is to provide an improved friction box for applying friction at a correct and constant pressure on the friction bar of a full-fashioned hosiery knitting machine which may be oiled by an unskilled worker with regular machine oil, said friction box being so constructed that it will not seize on the friction rod should the lubricant burn away, thus preventing the breaking of needles or the press off of the set of stockings being knitted.

Another object of the invention is to provide an improved friction box for the friction bar of a full-fashioned hosiery knitting machine which may be correctly adjusted at the factory and needs no tampering with by the operator once it is installed.

Another object of the invention is to provide an improved friction box for use with the friction bar of a full-fashioned hosiery knitting machine which will be highly efficient in operation and relatively inexpensive to manufacture and produce.

Other objects will appear as the description proceeds.

In the accompanying drawings which form a part of this application,

Figure 1 is a side elevation of the improved friction box and bar with shock absorbers at the ends of said bar being attached to the friction rod of a full-fashioned hosiery knitting machine;

Figure 2 is a vertical sectional view through a shock absorber and adjacent end of a friction bar showing the same in position on a friction rod;

Figure 3 is a sectional view taken on the line 3—3 of Figure 2;

Like characters of reference are used throughout the following specification and the accompanying drawings to designate corresponding parts.

Figure 4:
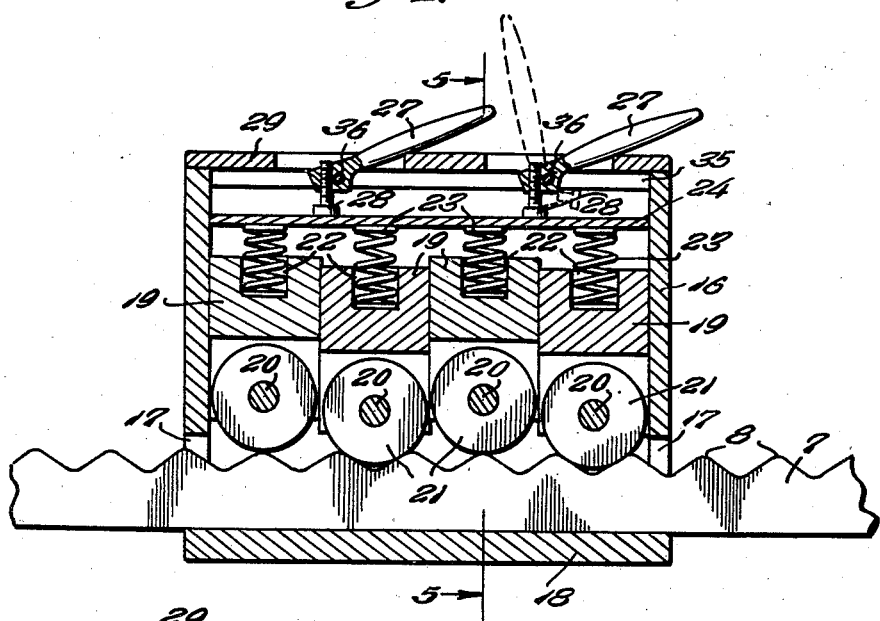
Figure 4 is a vertical sectional view through the improved friction box showing its interior mechanism with a friction bar extending therethrough.
Figure 5:
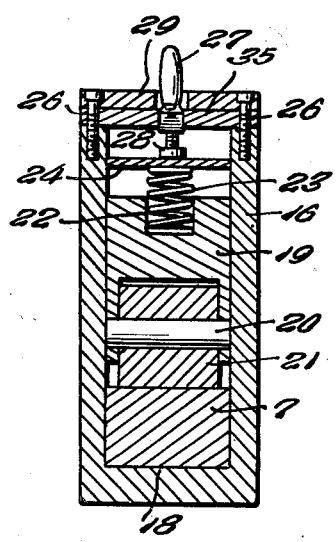
Figure 5 is a sectional view taken on the line 5—5 of Figure 4.
Figure 6:
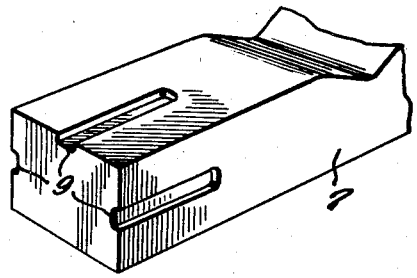
Figure 6 is a perspective view of one end of a friction bar.

In carrying out the invention, there is provided the usual form of friction rod 1 of a full-fashioned hosiery knitting machine, to which the improved friction box forming the subject matter of the instant invention is attached.

A pair of shock absorbing members generally designated by the reference numeral 2 will include the laterally extending housings 3 which are formed with the longitudinally extending rectangular shaped sockets 4 in their inner ends, and are split at their lower ends to provide the cap members 5 forming the split bearings for the said shock absorbing members. The friction rod 1 will support the pair of spaced shock absorbing members 2, which will be clamped thereon by the bolts 6 extending through the said cap members 5 and into the housings 3.

The friction bar 7 will be formed on its upper surface with the transversely extending teeth 8 forming a rack, the opposite ends of said bar being formed with the longitudinally extending adjusting grooves 9 on its opposite sides and top. The ends of the friction bar 7 will be slidably and adjustably received in the longitudinally extending sockets 4 in the housings 3, while the pressure plate stop screws 10 will extend through said housings 3 to be received in said longitudinally extending grooves 9 to limit the adjustment of the pressure plates 11 which engage the ends of said friction bar 7. Studs 12 are formed on the outer ends of the pressure plates 11 and support the adjacent ends of the coil tensioning or cushioning springs 13, the opposite ends of which extend into the bores 14 formed longitudinally through the housings 3 to receive the pressure plate adjusting screws or bolts 15 whereby the tension on said pressure plates may be varied.

The friction box comprises a substantially rectangular shaped body 16, the same being formed with apertures 17 through the lower portions of its opposite ends to slidably receive the friction bar so that its lower side will contact the bottom 18 of said body portion 16.

A plurality of inverted U-shaped blocks or guides 19 are received in said body 16 for vertical movement therein and are transversely apertured to receive the pins 20 upon which rollers 21 are mounted for engagement with the teeth or rack on the upper surface of the friction bar 7, with alternate rollers 21 engaging the upper ends of two teeth, while the adjacent alternate rollers 21 are received in the hollows between the teeth on the friction bar 7. Vertical sockets 22 are formed in the upper surfaces of the four blocks or guides 19 and receive or seat coil compression springs 23, whose upper ends support the pressure plate 24 which is of a size to snugly fit the inside dimensions of the box body 16. The elongated spaced bars or strips 35 are adapted to be secured at the upper end of the box body 16 by means of the screws or bolts 26 to prevent the pressure plate 24 from being forced out of the body 16, and said bars or strips also being transversely apertured to receive the pins 36 upon which the bell crank friction levers or handles 27 are mounted to apply or release pressure on the pressure plate 24. Adjusting headed screws 28 will be supported at the inner ends of the levers or handles 27 to selectively vary the pressure on said pressure plate. A slotted cover plate 29 may be secured on top of the friction box body 16, said slots permitting the operating levers or handles 27 to extend upwardly therethrough for ready manipulation by the operator of the knitting machine.

A slide 30 will extend transversely through the said friction box body 16 at its lower portion, and will support a friction handle 31 whereby the slide may slide in and out in order that the handle may engage or disengage the carrier rod fork (not shown) of the knitting machine.

The improved friction box will be set correctly at the factory when manufactured, and all the attention that it will need when installed on a friction rod, will be an occasional oiling with regular machine oil which may be applied by an unskilled worker.

From the foregoing description, it will be apparent that a highly effective and efficient friction box for the friction rod of a full-fashioned hosiery knitting machine will have been provided.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. An improved friction box in combination with a friction rod of a full-fashioned hosiery knitting machine, a notched friction bar disposed longitudinally through said box, and shock absorbers secured in spaced relation on said friction rod having means for adjustably supporting the opposite ends of said friction bar.

2. An improved friction box in combination with a friction rod of a full-fashioned hosiery knitting machine, a notched friction bar disposed longitudinally through said box, shock absorbers secured in spaced relation on said friction rod having means for adjustably supporting the opposite ends of said friction bar, and resiliently tensioned rollers adjustably supported in said box in contact with said friction bar.

3. An improved friction box in combination with a friction rod of a full-fashioned hosiery knitting machine, a notched friction bar disposed longitudinally through said box, shock absorbers secured in spaced relation on said friction rod having means for adjustably supporting the opposite ends of said friction bar, a plurality of vertically adjustable roller supporting members in said box, rollers supported in the lower ends thereof engageable with said friction bar, a pressure plate supported in said friction box, and resilient means between said rollers and said pressure plate.

4. The subject matter as claimed in claim 3, and means for applying pressure to said pressure plate.

5. The subject matter as claimed in claim 3, and means for applying variable pressure to said pressure plate.

6. An improved friction box in combination with a friction rod of a full-fashioned hosiery knitting machine, a notched friction bar disposed longitudinally through said box, shock absorbers secured in spaced relation on said friction rod having means for adjustably supporting the opposite ends of said friction bar, and resiliently tensioned pressure plates in said shock absorbers engageable with the ends of said friction bar.

7. The subject matter as claimed in claim 6, and means for variably tensioning said pressure plates.

8. An improved friction box in combination with a friction rod of a full-fashioned hosiery knitting machine, a notched friction bar disposed longitudinally through said box, shock absorbers secured in spaced relation on said friction rod having means for adjustably supporting the opposite ends of said friction bar, guide grooves in the ends of said friction bar, resiliently tensioned pressure plates in said shock absorbers, and means for limiting the movement of said pressure plates.

STANLEY GAGAS.